No. 641,379. Patented Jan. 16, 1900.
E. R. ESMOND.
DEVICE FOR TRANSMITTING POWER.
(Application filed Dec. 3, 1894.)
(No Model.) 2 Sheets—Sheet 1.

Witnesses:
D. H. Hayport
Pierson L. Wells

Inventor:
Ernest R. Esmond
By E. N. Dunham
His Attorney

THE NORRIS PETERS CO., PHOTO-LITHO., WASHINGTON, D. C.

No. 641,379. Patented Jan. 16, 1900.
E. R. ESMOND.
DEVICE FOR TRANSMITTING POWER.
(Application filed Dec. 3, 1894.)
(No Model.) 2 Sheets—Sheet 2.
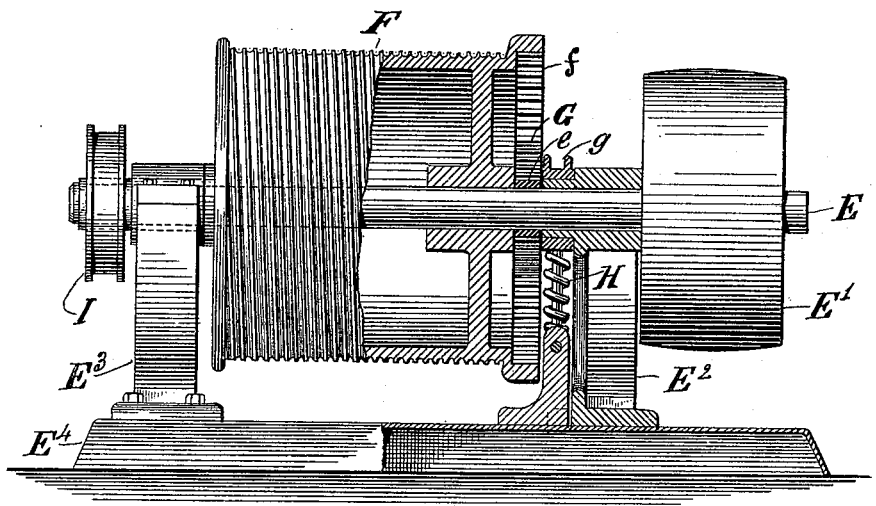
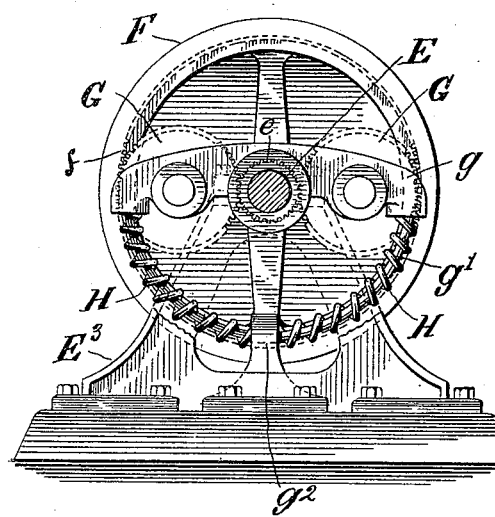
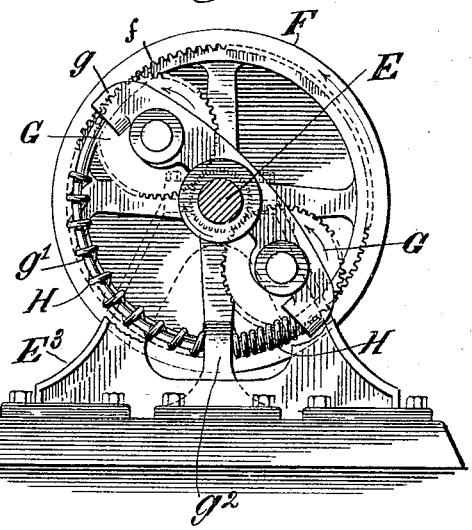
Witnesses:-
D. H. Hayward
Pierson L. Wells
Inventor:-
Ernest R. Esmond
By E N Dickerson
His Attorney

UNITED STATES PATENT OFFICE.

ERNEST R. ESMOND, OF NEW YORK, N. Y., ASSIGNOR TO HIMSELF AND EDWARD N. DICKERSON, OF SAME PLACE.

DEVICE FOR TRANSMITTING POWER.

SPECIFICATION forming part of Letters Patent No. 641,379, dated January 16, 1900.

Application filed December 3, 1894. Serial No. 530,652. (No model.)

*To all whom it may concern:*

Be it known that I, ERNEST R. ESMOND, of New York, in the county and State of New York, have invented a certain new and useful Improvement in Devices for Transmitting Power, of which the following is a specification.

My invention relates to devices for transmitting power from a driver to a driven shaft, drum, or pulley, and is especially directed toward the construction of a coupling placed intermediate of the driver and the driven shaft, drum, or pulley and adapted to transmit motion from the former to the latter.

The invention further provides a flexible coupling—that is, one by which motion is transmitted from one to the other without jar or shock, notwithstanding the fluctuations in load, within wide limits sustained by the driven shaft, drum, or pulley.

I will describe a device for transmitting power embodying my improvement and then point out the novel features in the claims.

Figure 1:
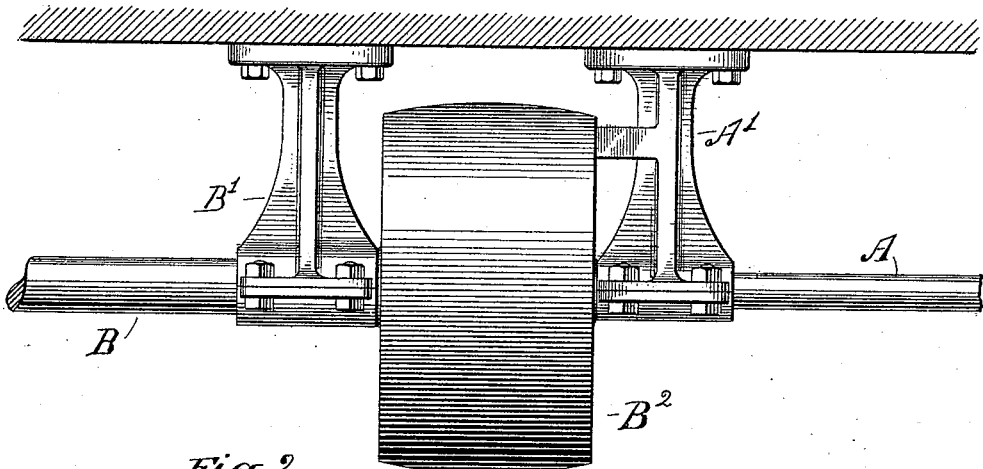
Figure 2:
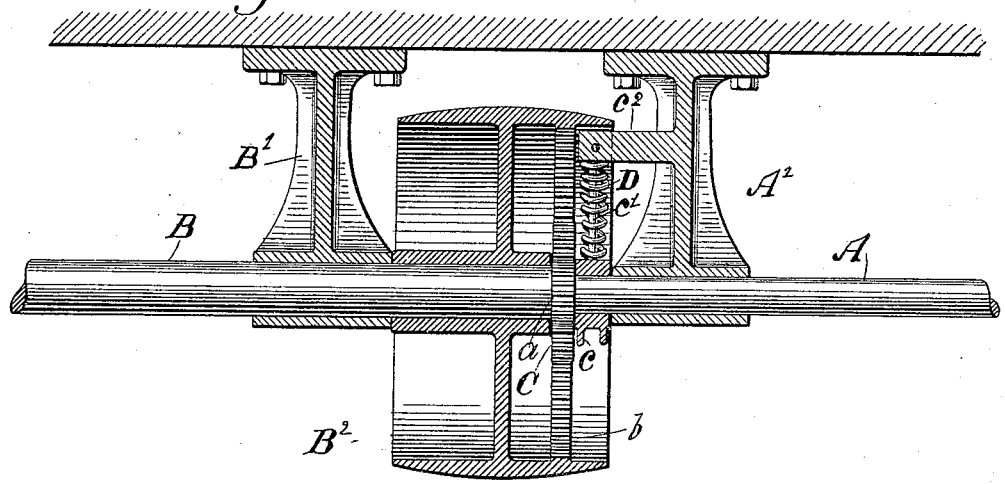
Figure 3:
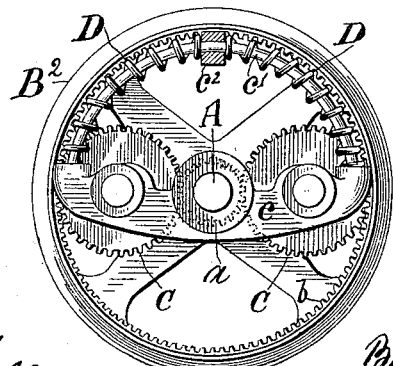

In the accompanying drawings, Figure 1 is a side elevation of a device for transmitting power embodying my improvement. Fig. 2 is a vertical longitudinal section of Fig. 1. Fig. 3 is an end elevation of the same, part, however, being removed to better show certain other parts. Fig. 4 is a longitudinal vertical section of my improvement as applied to a hoisting apparatus, part of the same, however, being shown in elevation. Fig. 5 is an end elevation of Fig. 4, certain parts being omitted. Fig. 6 is a view similar to Fig. 5, but shows certain parts in a position which they assume when in motion and transmitting power.

Similar letters of reference designate corresponding parts in all figures.

A designates what may constitute a driving-shaft, receiving power and being itself driven by any suitable means. It may be supported in a bearing A'.

B is a driven shaft journaled in a bearing B' in line with the driving-shaft A. It may be provided with a pulley $B^2$, which latter may be utilized to transmit power for any purpose by an encircling belt.

I have in the present instance designated and so described the shaft A and the shaft B as a "driving" and a "driven" shaft, respectively; but the duties they perform are mutually transferable, as B may constitute a driving-shaft or driver and A a driven shaft. In this latter case pulley $B^2$ may be utilized for rotating shaft B.

Firmly secured to shaft A, at or near its extremity adjacent to shaft B, is a pinion $a$. The pulley $B^2$ is provided with an internal gear $b$, which may be formed upon a flange projecting inwardly from the inner surface of the pulley, or it may be formed upon an independent ring or a number of segments and attached to the pulley.

C C are intermediate pinions journaled in a vibrating carrier $c$, which is pivoted to shaft A. In this illustration of my invention there are two pinions C C, one at each end of the carrier; but this is only to secure a better balance of the latter. The pinions C C each gear on the one hand with the pinion $a$ and on the other hand with the internal gear $b$.

The carrier can be a simple pendulous arm, which can be controlled either by a spring or by a weight. The controlling device shown in the drawings comprises a rod $c'$, curved in the arc of a circle struck from the axis of movement of the carrier as a center and secured at its ends to opposite ends of the carrier $c$, with which it will consequently move. The rod extends through an intermediate stationary bearing $c^2$, which in the present instance extends from the bearing A'. Encircling the rod $c'$ are two helical springs D D, one on each side of the stationary bearing $c^2$ and confined between the bearing and the ends of the carrier $c$. These springs bear in opposite directions on the carrier and hold it in its normal position.

In Figs. 4, 5, and 6 I have shown my improvement as applied to a hoisting apparatus. E is the driving-shaft, carrying a driving-pulley E', and mounted in bearings $E^2 E^3$, attached to a base-plate $E^4$. The shaft E is provided with a pinion $e$, and the drum F carries an internal gear $f$. Intermediate pinions G G are mounted at opposite ends of a vibrating carrier $g$, pivoted concentrically with the shaft E either to the shaft or a projection of the bearing $E^2$. The intermediate pinions G G each gear on the one hand with pinion $e$ and on the other hand with the internal gear $f$. The carrier $g$ may be a simple pendulous arm controlled either by a weight or a spring, as in the preceding example of my improvement. In the illustration shown this controlling device is similar to the one already described and comprises a curved arm $g'$, attached at its ends to opposite ends of the carrier $g$ and passing through an intermediate stationary bearing $g^2$, supported upon the base-plate $E^4$. Helical springs H H encircle the rod $g'$, interposed between the respective ends of the carrier $g$ and the stationary bearing $g^2$, which constitutes the abutment for the springs. The shaft E may be extended through the bearing E and provided at its protruding end with a suitable brake-wheel I, thereby permitting the braking power to be applied directly to the hoisting-drum. It will be seen that this construction provides a coupling which permits of the attainment of any desired difference within practical limits between the speed of the driver and the thing driven, and at the same time its utility as a flexible or yielding coupling is not impaired.

In using the terms "driving" and "driven" shafts throughout the specification and claims I do not wish to limit myself to what are ordinarily known as "shafts," but wish to include all constructions to which power may be applied or from which it may be obtained. For instance, such constructions may consist of pulleys or drums or driving or driven wheels.

By means of this construction, as will now be readily understood, the driving power is neither rigidly nor directly applied to the driven work. Great advantages result from this in many instances which are additional to the reduction in speed, which is the primary object of my invention. In many instances it is exceedingly desirable to avoid the shock between the power and the work when the work is suddenly to be done. Also, there are a number of cases in which the initial effort of doing the work is greater than the effort required after the work is commenced—as, for instance, in starting the moving vehicle or in the starting of certain machinery. My apparatus, therefore, in its complete form accomplishes three results: It reduces the speed between the driving and the driven shafts. It takes the shock of the work, suddenly applied, from the driven shaft and also reciprocally from the work, and it allows an interval of time to elapse between the application of the power and its effect upon the work, which to that extent stores the power and increases the first effect of the power upon the work, and my device accomplishes these results by a very simple and inexpensive mechanism which is applicable to many uses.

Having described my invention, what I consider as new, and desire to secure by Letters Patent, is—

1. The combination with two shafts having stationary bearings and in line with each other, of means connecting said shafts, whereby power may be transmitted from one to the other thereof without shock in the transmission; said means comprising a gear on each of said shafts, a gear intermediate the gears on said shafts, a support on which is mounted the axle of said intermediate gear, means in connection with said support for permitting a limited movement of said axle around one of said shafts, and a spring having one end thereof held stationary and the other end connected to said support, whereby the support will be returned when released, to a normal position, substantially as specified.

2. A coupling for transmitting power from one to the other of two shafts mounted in line and in stationary bearings, said coupling comprising a pinion on the driven shaft, an arm mounted loosely on the driven shaft, a gear mounted on said arm and in engagement with said pinion, an internal gear on the driving-shaft and in engagement with the gear on said arm, and a spring having one end thereof held stationary and the other end connected to said arm, whereby said spring may act upon said arm to return the latter to an absolute normal position, substantially as and for the purpose specified.

3. A shaft-coupling consisting of a shaft having an internal gear thereon, a shaft having a pinion thereon and concentric with said internal gear, a support free to revolve about said shafts and having attached thereto a rod, said rod having the form of an arc concentric with said shafts, an intermediate gear on said support and in mesh with said pinion and internal gear, a spring surrounding the bar upon said support, and a stationary piece for holding said spring at one point thereof, whereby, when said intermediate gear is released it will be returned to the normal position, substantially as and for the purpose specified.

4. In a shaft-coupling the combination with two shafts, of a gear on each shaft, a gear intermediate of the first-mentioned gears, a support on which is mounted the axle of said intermediate gear, said support constructed to permit a movement of said axle in an arc concentric with one of said shafts, a compressible spring, an arc-form guide for said spring arranged concentrically with said shaft, said spring having one end thereof held stationary and the other end connected to said support, whereby said spring may act to return said support to a normal position, substantially as described.

In testimony whereof I have signed my name to this specification in the presence of two subscribing witnesses.

ERNEST R. ESMOND.

Witnesses:
W. LAIRD GOLDSBOROUGH,
PIERSON L. WELLS.